July 1, 1930. W. J. MILLER 1,769,527
AUTOMATIC PROFILE, TRIMMER, AND JIGGER COMBINED
Original Filed Dec. 16, 1926
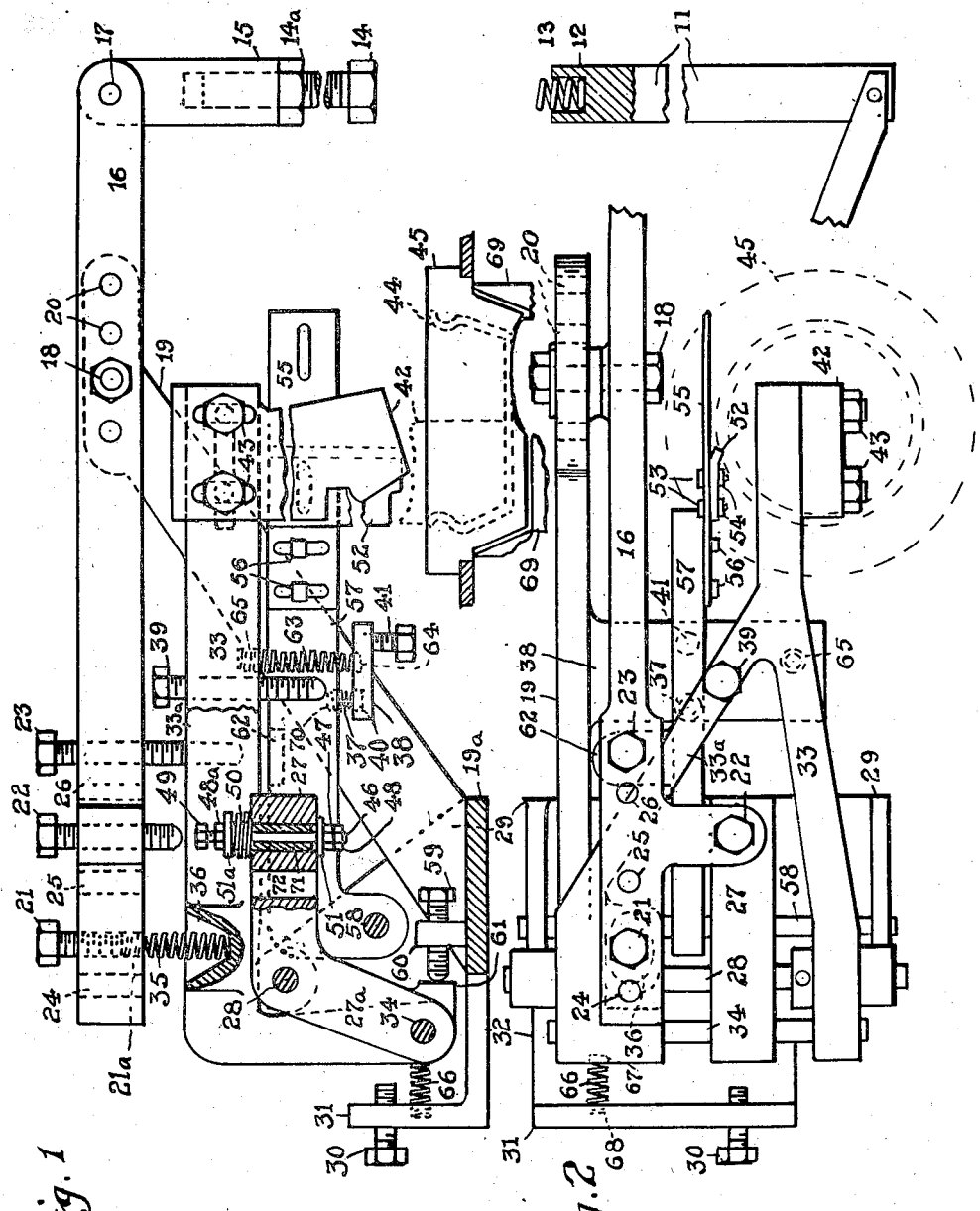
INVENTOR.
William J. Miller
BY Israel Benjamins,
ATTORNEY Patented July 1, 1930

1,769,527

UNITED STATES PATENT OFFICE

WILLIAM J. MILLER, OF SWISSVALE, PENNSYLVANIA

AUTOMATIC PROFILE, TRIMMER, AND JIGGER COMBINED

Application filed December 16, 1926, Serial No. 155,233. Renewed December 3, 1929.

My invention relates to profiles, trimmers and jiggers for use in the manufacture of articles from plastic materials, and it consists in the novel features, which are hereinafter more fully described.

One of the objects of my improvement is— to produce an automatic profile and jigger combined, in which the profile has imparted thereto a vertical as well as a horizontal motion, for use in the manufacture of undercut pottery ware.

Another object of my improvement is to provide a trimmer, which is operated in conjunction with said profile and jigger combined.

A further object of my invention is to provide sundry adjustments and limits to the movements of the above profile and trimmer, which may be made while the mechanism is in operation.

Another object of my improvement is to apply my above improved automatic profile and trimmer to a jigger mechanism such as described in my copending application for patent filed Nov. 17, 1926, Serial No. 148,872, in which mechanism mold carriers are arranged to be moved intermittently on a track over the jigger pitman and under the profile and trimmer carrier, thereby leaving no room for a continuous connection between said pitman and said profile and trimmer carrier.

A still other object of my improvement is to operate an automatic profile and trimmer from the jigger pitman.

Other objects and advantages will hereinafter appear.

I attain these objects by the mechanism, one form of which is illustrated in the accompanying drawings, or by any mechanical equivalent or obvious modification of the same.

In the drawings Fig. 1 is a side elevation of my automatic profile, trimmer and jigger combined, showing some parts thereof in cross section; and Fig. 2 is a plan view of the same.

Similar numerals refer to similar parts throughout the several views.

11 designates the upper end of a jigger pitman, such as used in my application for patent for Multiple and automatic jiggers for use in the manufacture of articles from plastic materials, Serial No. 148,872, filed Nov. 17, 1926, which pitman is employed to reciprocate one or more jigger spindles in unison therewith.

I provide the upper end of the pitman 11 with a depression 12, in which I place a compression spring 13, to have a resilient contact with the underside of an inverted screw 14, which is adjustably connected to the underside of a link 15, and is secured against accidental displacement therein by means of a safety nut 14ª. The spring 13 continues to act on said screw 14 after said pitman 11 stops.

The link 15 is pivotally connected to one end of a horizontally disposed rocker arm, walking beam or lever 16 by means of a pin 17, which is shown in Fig. 1.

The lever 16 is pivotally connected by means of a shiftable bolt or pin 18 to a bracket 19, having therein multiple openings 20, for interchangeably connecting thereto said bolt 18.

The bracket 19 has at the lower end thereof a base 19ª, by means of which it may be mounted on the frame of the jigger, which is described in my above copending application, and said base 19ª may be secured to said frame by any suitable means.

The phase of motion of said lever 16 with relation to said pitman 11 and said jigger may be varied and adjusted by means of said screw 14, and this adjustment may be made while the mechainsm is in operation.

The other end of said lever 16 has adjustably connected thereto screws 21, 22 and 23, for purposes, which are hereinafter described; it has also formed therein additional threaded openings 24 and 25, for said screw 21 to be interchangeably engaged therein, and another additional threaded opening 26, for said screw 23 to be interchangeably engaged therein.

A bell crank lever 27—27ª is pivotally connected by means of a spindle 28 to vertical brackets 29, made in one with said bracket 19. The horizontal displacement of the substantially vertical arm 27ª of said bell crank lever 27—27ᵃ in a direction from right to left in the drawings is limited and adjusted by means of a screw 30, which is adjustably connected to a vertical bracket 31, made in one with an extension 32 of said base 19ᵃ.

A forked arm 33—33ᵃ is pivotally connected by means of a spindle 34 to the arm 27ᵃ of said bell crank lever 27—27ᵃ.

A compression spring 35 has its lower end resting in a depression 36 in the upper side of one of the branches 33ᵃ of said arm 33—33ᵃ; the upper end of said spring 35 extends into a cavity 21ᵃ at the underside of said lever 16, and is abutting against the underside of said screw 21, to resiliently depress said arm 33—33ᵃ under the influence of said pitman 11 and lever 16, and move said arm 33—33ᵃ downwardly, until the lower end of a screw 39 thereon encounters a horizontal bracket 38, which forms an extension of said bracket 19. The screw 39 is adjustably connected to said branch 33ᵃ of said arm 33—33ᵃ by means of a threaded opening in the latter.

A spring 63 has its lower end resting in a depression 64 in said bracket 38, and its upper end extends into a cavity 65 in the underside of said arm 33ᵃ, to raise the latter, thereby causing the spring 35 to return the lever 16 with the screw 21 thereon in the opposite direction, when said pitman 11 recedes.

The phase of vertical motion of said arm 33—33ᵃ with relation to said lever 16 may be varied and adjusted by means of said screw 21 on said lever 16, and its limit of vertical motion downwardly may be varied and adjusted by means of said screw 39.

A profile 42 is shown as adjustably secured to the outer end of said arm 33—33ᵃ by means of screws 43, and is also shown in its operative position in dotted lines in Fig. 2.

The profile 42 and the end of the arm 33—33ᵃ, which is supporting the same, are provided with the usual vertical and horizontal slots, for universal adjustment of the position of said profile 42 on said arm 33—33ᵃ.

The depression of the arm 33—33ᵃ by means of said screw 21, as above described, causes the profile 42 to be lowered into operative position to act on a charge of material 44 on a mold 45, which may be mounted on and revolved with a reciprocating and revolving chuck and spindle, as described in the above copending application; said mold 45 may also be mounted on a jigger of usual design, if desired.

To afford a necessary horizontal motion to said profile 42, to enable it to shape the undercut surfaces of hollow pottery ware, I provide the substantially horizontal arm 27 of said bell crank lever 27—27ᵃ with a contact screw or bolt 46, which passes through a bushing 71 in one of a pair of openings 72 in said lever 27 and is adjustably connected thereto by means of a nut 47 and safety nut 48; a washer 51 is interposed between said nut 47 and the underside of said lever 27; the head 49 of said screw or bolt 46 is adapted to be intermittently depressed by the lower end of said screw 22 on said lever 16, and a spring 50 is provided, with its lower end resting on said lever 27, and to abut at its upper end against a washer 51ᵃ under a safety nut 48ᵃ on said bolt 46, to make the contact between the lower end of said screw 22 on said lever 16 and the head 49 of said bolt 46 resilient.

It is evident that the downward motion of the branch 27 of said lever 27—27ᵃ will produce a substantially horizontal motion of said branch 27ᵃ thereof; the latter motion will also be imparted to said spindle 34 and said arm 33—33ᵃ, whereby a horizontal motion will be imparted to said profile 42 consecutively with the vertical motion thereof, which is produced as hereinbefore described. The arm 33—33ᵃ may be caused to move horizontally, to bring the profile into position, against the resistance of a compression spring 66, disposed in seats 67 and 68, respectively formed in the lower rear portion of the arm 33ᵃ and in the bracket 31, said spring 66 tending to return the arm 33—33ᵃ with the profile thereon to its normal horizontal position.

The phase of horizontal motion of said arm 33—33ᵃ, with the profile 42 thereon, with relation to said lever 16 may be varied and adjusted by means of said screws 22 and 46; and the limit of its horizontal motion in the direction of moving said profile into operative position may be varied and adjusted by means of said screw 30.

The horizontal motions of said arm 27ᵃ in a direction from left to right in the drawings is limited and adjusted by means of a screw 59, which is shown as adjustably engaged with a bracket 60 on said base 19ᵃ, to act on a spur 61 at the lower end of said arm 27ᵃ.

The requisite extent of each of said motions may be determined by the adjustments of said screws 21, 22, 30, 39, 59 and 46.

A trimmer 52 is adjustably secured by means of bolts 53 and nuts 54 to a bracket 55, which is in turn adjustably secured by screws 56 to an arm 57, which is pivotally connected by means of a spindle 58 to said bracket 29.

The trimmer 52 and the bracket 55 are provided with horizontal and vertical slots for universally adjusting said trimmer 52 on said bracket 55, and the latter on said arm 57.

The trimmer arm 57 has thereon a projection or boss 62, to receive the impact of said screw 23, whereby said arm 57 may be depressed under the influence of said pitman 11 and said lever 16, thereby lowering said trimmer 52 into operative position, to trim the rim of the material 44 on said mold 45, which is shown as supported by a chuck 69 of a reciprocating jigger.

The phase of motion of said arm 57 and the trimmer 52 thereon with relation to said lever 16 may be varied and adjusted by means of said screw 23.

The lowest position of said trimmer 52 is adjusted and limited by means of a screw 41, which is adjustably engaged with said horizontal bracket 38, as shown in Fig. 1. To raise said arm 57 with the trimmer 52 thereon, I provide a compression spring 37, which has its lower end resting in a depression 40 in said bracket 38 and its upper end extending into a cavity 70 in the underside of said arm 57, to act thereon, when said pitman 11 recedes, thereby also returning said lever 16 to its original position.

The following is the cycle or sequence of events during the operation of my automatic profile, trimmer and jigger combined:

1st. The profile 42 is lowered into operative position.

2nd. The profile 42 is moved horizontally in a direction from right to left in the drawings to shape the material 44 inside of the hollow mold 45, which has therein an undercut, as shown in Fig. 1.

3rd. The trimmer 52 is depressed, to act on the rim of the material 44.

4th. The trimmer is raised.

5th. The profile is returned horizontally in a direction from left to right in the drawings; and 6th. The profile is raised vertically to its original position.

By means of the above described mechanism the motion of the jigger pitman 11 autotimatically operates both the profile and the trimmer, and imparts to said profile both a vertical and a horizontal motion, the former of said profile motions may be in a direction opposite to that of said pitman 11, and the latter of said profile motions may be necessary in the manufacture of under-cut hollow pottery ware.

The motions of the various parts of my automatic profile, trimmer and jigger combined may be timed by the sundry adjusting means, which are hereinbefore described, and these timing operations and adjustments may be made while the mechanism is in operation.

Additional adjustments may also be obtained by interchanging the position of the screw 21 by placing it in either of the threaded openings 24 or 25 in said lever 16 and correspondingly changing the position of the spring 35, whereby the arm 33—33ª will have its angle of oscillation changed, thereby also changing the stroke of the profile 42, which is connected to said arm 33—33ª.

By interchanging the position of said screw 23 by placing it in the threaded opening 26 in said lever 16 and correspondingly extending the boss 62, the arm 57 will have its angle of oscillation changed, thereby also changing the stroke of the trimmer 52, which is connected to said arm 57.

Any other reciprocating part of the jigger or chuck 69, instead of the pitman 11, may be employed to actuate the lever 16, if desired; and the lever 16 may be replaced by another member actuated by said part.

The screws 21, 22 and 23 may be carried by separate levers or members, instead of being all on the same lever, and some of these screws may be omitted, if desired.

Many other changes may be made in the details of my automatic profile, trimmer and jigger combined without departing from the main scope of my invention and parts of my invention may be used without other parts.

I do not, therefore, restrict myself to the details as shown in the drawings; but I intend to include also all mechanical equivalents and obvious modifications of the same within the scope of my invention.

I claim as my invention and desire to secure by Letters Patent:

1. In a device of the class specified, the combination with a jigger provided with a reciprocating member moving in unison therewith, of a resiliently mounted profile, and means cooperating with the reciprocating member for moving said profile into operative position.

2. In a device of the class specified, the combination with a jigger provided with a reciprocating member, of a profile adapted to be depressed into operative position, means for transmitting motion from the reciprocating member to said profile to depress the latter at each reciprocation of said member, and means for returning the profile to its original position.

3. In a device of the class specified, the combination with a jigger provided with a vertically reciprocating member, of a rocking member mounted adjacent said reciprocating member, and resiliently mounted profile and trimmer supporting members, said rocking member being adapted to impart motion to said profile and trimmer supporting members through intermittent contact with said reciprocating member.

4. In a device of the class specified, the combination with a jigger provided with a vertically reciprocating member, of a resiliently mounted oscillatable profile supporting arm, a motion transmitting member mounted adjacent said reciprocating member and said arm, and means for converting the reciprocatory motion of said reciprocating member into oscillatory motion to oscillate said arm.

5. In a device of the class specified, the combination with a jigger provided with a reciprocating member, of a resiliently mounted oscillatable profile supporting arm, a motion transmitting member mounted adjacent said reciprocating member and said arm, and means for producing an intermittent contact between said latter member and arm to automatically move the profile into operative position.

6. In a device of the class specified, the combination with a jigger provided with a reciprocating member moving in unison therewith, of a depressible, resiliently mounted oscillatable arm, a profile adjustably mounted thereon, and means for transmitting motion from said reciprocating member to said arm to impart substantial vertical and horizontal motion to said profile.

7. In a device of the class specified, the combination with a jigger provided with a reciprocating member moving in unison therewith, of a resiliently mounted oscillatable arm, a profile adjustably secured thereto, means for transmitting motion from said reciprocating member to said arm to impart substantial vertical and horizontal movement to said profile, and means for varying the phase of said motion and range of said movement while in operation.

8. In a device of the class specified, the combination with a jigger provided with a reciprocating member moving in unison therewith, of a resiliently mounted oscillating arm, a profile adjustably secured thereto, a resiliently mounted trimmer, and means for transmitting motion from said member to said profile and trimmer.

9. In a device of the class specified, the combination with a jigger provided with a reciprocating member moving in unison therewith, of a resiliently mounted oscillatable arm having a profile adjustably secured thereto, a separate resiliently mounted arm having a trimmer adjustably secured thereto, and a rocker arm mounted on a stationary bracket adjacent said reciprocating member and said profile and trimmer supporting arms and transmitting motion from said member to said arms.

10. In a device of the class specified, the combination with a jigger provided with a reciprocating member moving in unison therewith, of a resiliently mounted oscillatable profile supporting member and depressible trimmer supporting member, a rocker arm mounted adjacent said reciprocating member and said profile and trimmer supporting members for transmitting motion from said first-named member to said latter members, and a resilient means interposed between said rocker arm and said reciprocating member.

11. In a device of the class specified, the combination with a jigger provided with a reciprocating member moving in unison therewith, of a resiliently mounted oscillatable profile supporting member and depressible trimmer supporting member, a rocker arm mounted adjacent said reciprocating member and said profile and trimmer supporting members for transmitting motion from said first-named member to said latter members, and means for adjusting, while in operation, the phase of said motion.

12. In a device of the class specified, the combination with a jigger provided with a reciprocating member moving in unison therewith, of a resiliently mounted vertically and horizontally movable profile, means for transmitting reciprocatory motion from said member to impart substantial vertical and horizontal movements to said profile, and means for adjusting, while in operation, the range of said latter movements.

13. In a device of the class specified, the combination with a jigger provided with a reciprocating member moving in unison therewith, of a resiliently mounted oscillatable profile supporting member, a trimmer supporting member depressible against spring tension, a pivotally mounted lever for oscillating said profile supporting member, and a rocker arm mounted adjacent said reciprocating member and said profile and trimmer supporting members and said lever and operating to transmit reciprocatory movement to said trimmer supporting member and simultaneous reciprocatory and oscillatory movement to said profile supporting member.

14. In a device of the class specified, the combination with a jigger provided with a reciprocating member moving in unison therewith, of a resiliently mounted oscillatable profile supporting member, a trimmer supporting member depressible against spring tension, a fulcrumed bell-crank lever for oscillating said profile supporting member, a rocker arm mounted adjacent said reciprocating member and said profile and trimmer supporting members and said bell-crank lever and operating to transmit variable reciprocatory movement to said trimmer supporting member and simultaneous reciprocatory and oscillatory movement to said profile supporting member, and means for adjusting, while in operation, the reciprocation and oscillation of said profile and trimmer supporting members relatively to the reciprocation of said reciprocating member.

15. In a device of the class specified, the combination with a jigger provided with a reciprocating member moving in unison therewith, brackets, oscillatable and reciprocable profile and trimmer supporting levers pivotally connected to said brackets and depressible against spring tension, a member for transmitting motion from said reciprocating member to said profile and trimmer supporting levers to move the profile and trimmer, respectively, substantially vertically and horizontally and vertically into operative position, and adjustable cushioning devices interposed between said motion transmitting member and profile and trimmer supporting levers to make the reaction of said profile and trimmer resilient.

16. In a device of the class specified, the combination with a jigger provided with a reciprocating member moving in unison therewith, brackets, oscillatable and reciprocable profile and trimmer supporting levers pivotally connected to said brackets and depressible against spring tension, a member for transmitting motion from said reciprocating member to said profile and trimmer supporting levers to move the profile and trimmer, respectively, substantially vertically and horizontally and vertically into operative position, adjustable cushioning devices interposed between said motion transmitting member and profile and trimmer supporting levers, and adjustable means for limiting the range of movement of said profile and trimmer.

17. In a device of the class specified, the combination with a jigger provided with a reciprocating member moving in unison therewith, of a bracket, a bell crank lever pivotally connected to said bracket, a resiliently mounted oscillating arm pivotally connected to said bell crank lever, a profile adjustably secured on said arm, a rocker arm for transmitting motion from said reciprocating member to said profile, and adjustable contact members on said rocker arm adapted to contact with said oscillating arm and bell crank lever to move said profile substantially vertically and horizontally into operative position.

18. In a device of the class specified, the combination with a jigger provided with a reciprocating member, of a vertically and laterally movable profile supporting member, a member for transmitting motion from said reciprocating member to said profile supporting member, and adjustable means on said motion-transmitting member to produce an intermittent contact therebetween and said reciprocating member.

19. In a device of the class specified, the combination with a jigger provided with a reciprocating member, of a vertically and laterally movable profile supporting member, a member for transmitting motion from said reciprocating member to said profile supporting member to depress the profile into position, means for returning the profile supporting member to its original position, adjustable means to produce an intermittent contact between said reciprocating member and motion-transmitting member, and a cushioning means interposed between said adjustable means and reciprocating member.

WILLIAM J. MILLER.